US 8,594,482 B2

(12) United States Patent
Fan et al.

(10) Patent No.: US 8,594,482 B2
(45) Date of Patent: Nov. 26, 2013

(54) AUDITING VIDEO ANALYTICS THROUGH ESSENCE GENERATION

(75) Inventors: Quanfu Fan, Somerville, MA (US); Zuoxuan Lu, Yorktown Heights, NY (US); Sachiko Miyazawa, Bronx, NY (US); Sharathchandra Umapathirao Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 12/986,233

(22) Filed: Jan. 7, 2011

(65) Prior Publication Data

US 2011/0280547 A1    Nov. 17, 2011

Related U.S. Application Data

(60) Provisional application No. 61/334,256, filed on May 13, 2010.

(51) Int. Cl.
*H04N 5/765* (2006.01)
*H04N 5/931* (2006.01)

(52) U.S. Cl.
USPC .......................................... 386/200; 386/204

(58) Field of Classification Search
None
See application file for complete search history.

(56) References Cited

U.S. PATENT DOCUMENTS

| 5,965,861 | A | 10/1999 | Addy et al. |
| 7,468,662 | B2 | 12/2008 | Velipasalar et al. |
| 7,631,808 | B2 | 12/2009 | Kundu et al. |
| 2006/0243798 | A1 | 11/2006 | Kundu et al. |
| 2007/0031063 | A1 | 2/2007 | Zhou |
| 2007/0057049 | A9* | 3/2007 | Kundu et al. ................. 235/383 |
| 2007/0058040 | A1 | 3/2007 | Zhang et al. |
| 2007/0208680 | A1 | 9/2007 | Wang et al. |
| 2007/0272734 | A1 | 11/2007 | Lipton et al. |

(Continued)

FOREIGN PATENT DOCUMENTS

| WO | 03044727 A1 | 5/2003 |
| WO | 2007002763 A2 | 1/2007 |
| WO | 2007078475 A2 | 7/2007 |
| WO | 2007145623 A1 | 12/2007 |

OTHER PUBLICATIONS

International Search Report for International Application No. PCT/EP/2011/057445 dated Aug. 19, 2011.

(Continued)

*Primary Examiner* — William C Vaughn, Jr.
*Assistant Examiner* — Oluwaseun A Adegeye
(74) *Attorney, Agent, or Firm* — Patrick J. Daugherty; Driggs, Hogg, Daugherty & Del Zoppo Co. LPA (57) ABSTRACT

Video analytics data is audited through review of selective visual essence subsets of visual images from a visual image stream as a function of a temporal relationship of the essence subset images to a triggering alert event. The visual essence subset comprehends an image contemporaneous with the triggering alert event and one or more other images occurring before or after the contemporaneous image. The generated visual essence is presented for review to determine whether the triggering alert event is a true or false alert, or whether additional data from the visual image stream is required to make such a determination. If determined from the presented visual essence that the additional data is required make the true or false determination, then additional data is presented from the visual image stream for review.

16 Claims, 3 Drawing Sheets

(56) References Cited

U.S. PATENT DOCUMENTS

| | | |
|---|---|---|
| 2008/0018738 A1 | 1/2008 | Lipton et al. |
| 2009/0016600 A1 | 1/2009 | Eaton et al. |
| 2009/0208111 A1 | 8/2009 | Jeong et al. |
| 2009/0226099 A1 | 9/2009 | Kundu et al. |
| 2000/9029702 | 12/2009 | Lipton et al. |
| 2010/0013926 A1 | 1/2010 | Lipton et al. |
| 2010/0026802 A1 | 2/2010 | Titus et al. |

OTHER PUBLICATIONS

Dumont et al, Rushes video parsing using video sequence alignment, IEEE, 2009, Seventh International Workshop on Content-Based Multimedia Indexing, pp. 44-49.

Fan et al, Fast Detection of Retail Fraud Using Polar Touch Buttons, IEEE, Jun. 28, 2009-Jul. 3, 2009, pp. 1266-1269.

Kim, C. et al, An integrated Scheme for Object-based Video Abstraction, Association for Computing Machinery, 8th ACM International Conference on Multimedia, Publication Date: Dec. 1, 2000, pp. 303-311.

Yu, Elden et al, Detection of Stable Contacts for Human Motion Analysis, Association for Computing Machinery, Proceedings of the 4th ACM International Workshop on Video Surveillance and Sensor Networks, VSSN-06, Publication Date: Dec. 1, 2006, Item Identifier (DOI): 10.1145/1178781. 1178796.

Quanfu Fan et al, Detecting Sweethearting in Retail Surveillance Videos, IBM paper, IBM T.J. Watson Research Center, Hawthorne, NY, 4 pp, Jul. 1, 2009.

Quanfu Fan et al, Recognition of Repetitive Sequential Human Activity, IBM paper, IBM T.J. Watson research Center, Hawthorne, NY, 9 pp, Jul. 1, 2009.

Pavan Turaga et al, Machine Recognition of Human Activities: A survey, IEEE, 2008, 15 pp.

S. Pankanti et al, Multi-media Compliance: A practical paradigm for managing business integrity, IEEE, Jul. 1, 2009, pp. 1562-1563.

Guillaume Milcent and Yang Cai, Location Based Baggage Detection for Transit Vehicles, Dec. 9, 2005, Carnegie Mellon University, Pittsburgh, PA, USA.

Lei Ding et al, Graph Based Event Detection from Realistic Videos Using Weak Feature Correspondence, 2010, IBM T. J. Watson Research Center, Hawthorne, NY, USA, presented at ICASSP 2010.

\* cited by examiner

AUDITING VIDEO ANALYTICS THROUGH ESSENCE GENERATION

CROSS-REFERENCE TO RELATED APPLICATION

This application claims the benefit of the provisional patent application previously filed in the United States Patent and Trademark Office by common inventors Quanfu Fan, Zuoxuan Lu, Sachiko Miyazawa and Sharathchandra U. Pankanti entitled "AUDITING VIDEO ANALYTICS", filed May 13, 2010, Ser. No. 61/334,256, Confirmation No. 8023.

TECHNICAL FIELD

The present invention relates to video analytics, and more particularly to auditing video analytics data to distinguish errors.

BACKGROUND

Video analytics comprise a variety of technologies that use computers and other programmable devices and associated systems to analyze video input for specific data, behavior, objects, etc. within a video input. Video analytics may be implemented in software applications running on processors inside a computer or device, including on embedded programmable device platforms in video cameras, recording devices, or specialized video processing units. Video analytics may be useful in evaluating the contents of video to determine information with respect to the actions and movements of people within the video.

BRIEF SUMMARY

In one embodiment, a method for auditing video analytics data through review of selective subsets of visual images includes generating a visual essence subset of images via a programmable device from a visual image stream as a function of a temporal relationship of each of the visual essence subset images to a triggering alert event. The visual essence subset comprehends an image contemporaneous with the triggering alert event and one or more other images occurring before or after the contemporaneous image. The generated visual essence is presented for review to determine whether the triggering alert event is a true or false alert, or whether additional data from the visual image stream is required to make such a determination. If determined from the presented visual essence that the additional data is required make the true or false determination, then additional data is presented from the visual image stream for review.

In another embodiment, a computer system includes a processing unit, computer readable memory and a computer readable storage system. Program instructions on the computer readable storage system cause the processing unit to generate a visual essence subset of images via a programmable device from a visual image stream as a function of a temporal relationship of each of the visual essence subset images to a triggering alert event. The visual essence subset comprehends an image contemporaneous with the triggering alert event and one or more other images occurring before or after the contemporaneous image. The generated visual essence is presented for review to determine whether the triggering alert event is a true or false alert, or whether additional data from the visual image stream is required to make such a determination. If determined from the presented visual essence that the additional data is required make the true or false determination, then additional data is presented from the visual image stream for review.

In another embodiment, a computer program product includes program instructions to generate a visual essence subset of images via a programmable device from a visual image stream as a function of a temporal relationship of each of the visual essence subset images to a triggering alert event. The visual essence subset comprehends an image contemporaneous with the triggering alert event and one or more other images occurring before or after the contemporaneous image. The generated visual essence is presented for review to determine whether the triggering alert event is a true or false alert, or whether additional data from the visual image stream is required to make such a determination. If determined from the presented visual essence that the additional data is required to make the true or false determination, then additional data is presented from the visual image stream for review.

In another embodiment, a service provides for auditing video analytics data through review of selective subsets of visual images. The service comprehends providing a computer infrastructure that generates a visual essence subset of images from a visual image stream as a function of a temporal relationship of each of the visual essence subset images to a triggering alert event. The visual essence subset comprehends an image contemporaneous with the triggering alert event and one or more other images occurring before or after the contemporaneous image. The computer infrastructure presents the generated visual essence for review to determine whether the triggering alert event is a true or false alert, or whether additional data from the visual image stream is required to make such a determination. If determined from the presented visual essence that the additional data is required to make the true or false determination, then additional data is presented from the visual image stream for review.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes transitory, propagation or carrier wave signals or subject matter and includes an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that does not propagate a signal but can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Video analytics are methods, processes and systems used to evaluate the contents of video images to determine specified information from the video image. The information may be readily obtained from an image or picture, for example, a review of a number of vehicles on a section of roadway within an image may indicate traffic congestion. Multiple images, perhaps from multiple cameras, may also be considered to determine specified information, for example, considering images from different times, or from multiple camera feeds, may enable determination of speed of traffic flow or predict slowdowns due to heavy flow on the same roadway. Changing weather patterns may be observed, future weather predicted, as well as animal movements and migrations. Physical phenomena, such as structural changes and failures (for example, cracks in structural members, bending and sagging, rust, peeling or chipping paint, erosion, surface wearing and cracking, stream bed changes, silt build-up, etc.) may also be observed or detected, for example, through comparison of elements in images to the same elements in earlier-in-time images. Thus, a variety of specified information relative to the actions and movements of natural phenomena, objects, flora and fauna may thus be recognized or determined through analyzing image content through video analytics.

Video analytics applications may be further useful in determining the meaning or import of aspects of the video images, for example, to determine the motivations, implications or meaning of an action or inaction reflected by a video input, in one aspect to thereby determine or predict what a person's actions within a video show or imply with respect to expected or specified behavior. Thus, video analytics may be used to determine whether a person shown in a given area is trespassing or whether their presence is authorized, for example, by analyzing clothing (uniform vs. non-uniform), time of day (during business hours vs. after business hours), means of entry (correlated to a previous movement through an admission gate?), etc. Accordingly, video analytics are useful in a wide range of applications, and some illustrative but not exhaustive examples include property protection, safety and security contexts.

However, the efficacy of prior art systems incorporating automated video analytics systems is limited. Human auditing is generally required to apply human analysis and discretion in adjudicating and parsing genuine events of interest from false alerts, which requires human review of video feeds used by the automated video analytics systems to trigger alerts, and thus such systems and methods still require the streaming of video data to a human auditor, resulting in large bandwidth and/or memory storage requirements to provide real-time and/or archival video stream data to an auditor. As automated video analytics systems generally generate a large number of false alerts, a substantial amount of video streaming may still be required, reducing the bandwidth, storage and times savings achieved over human analysis of the raw video streams.

Furthermore, wading through the automated video analytics systems results may be an extremely labor-intensive process. Human auditing implementation problems and costs may also rise in proportion to the numbers of cameras or video feeds utilized, with efficiencies diminishing with large numbers of cameras or video feeds. Auditing systems may also suffer from limited network bandwidths if data being audited is accessed through network systems, for example, remotely through browsing applications.

Figure 1:
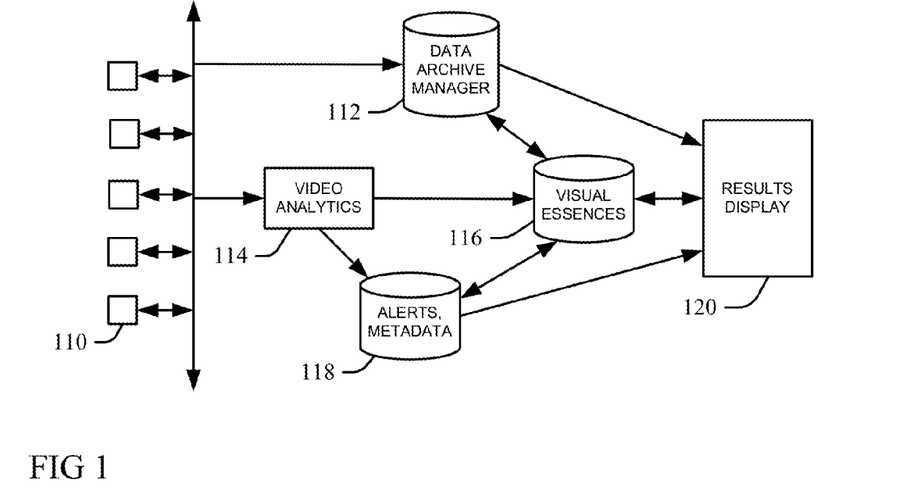
FIG. 1 is a diagrammatic illustration of an embodiment of a system for human auditing of video analytics data according to the present invention.

Referring now to FIG. 1, an embodiment of a method or system for human auditing of video analytics data according to the present invention is illustrated. At least one data sensor 110 provides video data (which may include video, audio, text, etc.) to a data archive manager 112 and to a video analytics component 114. Although functions of the video analytics component 114 may be performed by a human auditor through real-time review of video feeds or other data, embodiments of the present invention may use an automated video analytics system for the video analytics component 114 to enable automated alert generation, which may realize rates of data throughput which are not possible through a simple human review of video or image feeds (for example, to distinguish and detect some motions from other motions in regions of interest (ROI's) in video images, or to distinguish correlations to other transaction data stream items within and without specific time thresholds, as discussed more fully below).

The video analytics component 114 analyzes the video data input and determines the presence or occurrence of one or more alerts in the video data and outputs alert data and associated metadata at 118. A visual essence 116 of each of the alerts is selected from the video data to provide minimal but sufficient information for a human auditor to quickly review and immediately make a true-false determination with respect to the alert, if possible, to thereby filter out false alerts in a more efficient manner and presentation with respect to time and data size relative to reviewing the larger originating video and data streams. The visual essence is composed and displayed at a results display 120 in a manner wherein it may be quickly reviewed and the accuracy of the alert quickly determined on a faster basis relative to reviewing a larger video feed. The productivity of limited human auditor resources may thus be maximized by reducing the amount of video and other data that must be considered in order to make determinations regarding event occurrences represented by the original video stream.

Figure 2:
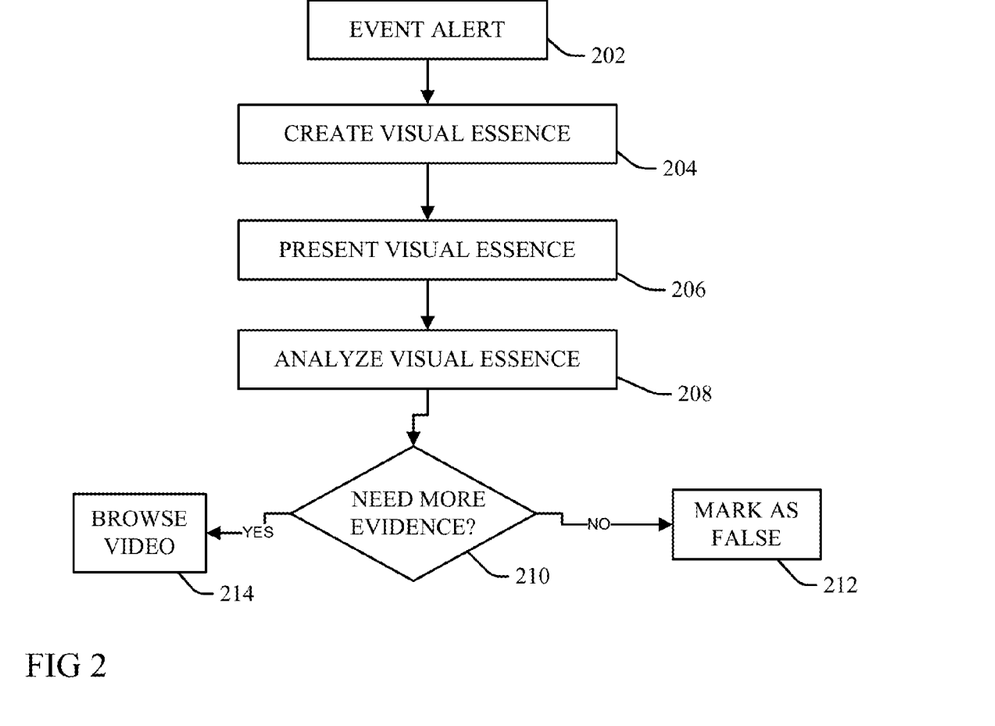
FIG. 2 is a diagrammatic flow diagram illustration of a system according to the present invention.

More particularly, FIG. 2 illustrates a system or method for auditing video information as a function of visual essence data according to the present invention. An alert of an event of concern is provided at 202 from video analytics alert results, for example as generated from the video analytics device 114 of FIG. 1. In response to the alert at 202, at 204 a visual essence is created for association with the alert by extraction of a subset of images from video stream data, and optionally incorporating text and other non-visual data. The video and other data may be extracted in real-time directly from video cameras or other data sensors (for example, bar code scanners, turnstiles, etc.), or from video and non-video data stored in one or more storage devices (for example, from the data archive manager 112 of FIG. 1), and further as a function of a context of the alert as provided or indicated by the video analytics. The subset still images, and optional textual or non-visual data, provide a summary of information automatically selected as a function of image content and system context, the set of information condensed relative to the larger video and non-visual source data and generated as a visual essence associated with the alert. The information may be derived from multiple resources (multiple cameras, transaction logs, identification data and logs, etc.).

Thus, the visual essence is presented to a human auditor in association with the alert at 206 to enable a human analyst to review and analyze the presented visual essence information at 208 to immediately make a true-false determination with respect to the alert, if possible, to thereby filter out false alerts in a more efficient manner and presentation with respect to time and data size relative to reviewing the larger originating video and data streams. Generally a human can more quickly parse out errors and false positives than a computer video analytic system. Although human intelligence is much better, it is generally more expensive and inefficient with respect to large amounts of video data; the present invention utilizes the visual essences to make the human auditor more efficient and less costly than prior art human and computerized auditing systems. If the information conveyed by the visual essence is sufficient and no further information or data is needed, then at 212 the alert is quickly culled as false. If instead the analysis is inconclusive or more information is otherwise needed as indicated at 210, then the auditor may request more data, for example requesting additional data or streaming video and browsing the additional video at 214.

The visual essence comprises a single image, a set of images or a compact stream subset (and optionally incorporating text and other non-visual data) from a larger, original data source, i.e. a video stream and optionally other associated data. The visual essence may have a much smaller data size relative to a video feed or portion thereof (for example, one, two or three images with text compared to a stream of many more images over a period of time), reducing bandwidth, memory and other system resource demands. Examples of the result display 120 include a browser window displayed in a computer desktop, chat and text messaging applications that display images on cellular phones and other mobile devices, and additional implementations will be apparent to one skilled in the art.

The visual essences 116 each comprise at least one image that is contemporaneous in time with the alert event triggering the creation of the visual essence (i.e. occurring at the same time or immediately proximate in time), and at least one other image that occurs before or after the contemporaneous image. The visual essences 116 are then provided to an analyst in a results browser or other presentment device at 120 for auditing for determination as to the validity of the alert, for example, to determine whether the alert associated with the generated visual essence is a false alert or a true indication of a specified or associated event occurrence.

Data may be retrieved from the data archive manager 112 for generation of the visual essences at 116, and the auditor may also communicate with the data archive manager 112 at 120 to retrieve additional data as needed. In the present example, the visual essence is provided to a human analyst through a display device 120, though in other embodiments auditing at 120 may be performed by automated video analytics systems applying one or more algorithms alone or in combination with a human auditor.

The visual essence is selected as a function of the alert subject matter context to provide for an auditor to quickly analyze and identify information within the source video data in order to efficiently make sense of what happens in the domain of the selected video data with respect to specified events, actions, behaviors, etc. of concern (alerts) from a limited sampling of the video data, for example, to determine that an alert is false or true from a review of only one single image or a small set of images rather than reviewing the much larger (in both data size and time of display) original video feed of a larger set of images. The efficacy of human auditing of the video analytics data is improved by first extracting a visual essence of an alert that provides a brief summary of the alert integrating representative images and other cues available. The visual essence allows the auditor to quickly determine (for example, in seconds) whether or not further investigation is needed without watching any source video or other non-essence video data: the auditor needs only to dive into an archive system for more evidence when necessary.

As a "false" determination may be made solely from the visual essence at 212, review time and resources saving are realized over prior art systems that require browsing of the video stream or some other additional data retrieval and review. The present invention enables an auditor to prune out a large portion of false alerts in a shorter amount of time relative to review of larger source video or multimedia stream inputs as required in the prior art, and to provide visual essences associated with the video analytics results to an analyst in a video investigation process that may be shortened relative to prior art auditing processes, without compromising analysis accuracy.

Embodiments of the present invention provide frameworks for intelligently managing computational and bandwidth resources to maintain an acceptable level of performance for video analytics. Thus, a framework may be provided for visually summarizing the results of an analytics system, wherein a visual summary essence is depicted in one or more (in some examples, annotated) images and text. Based on an analyst inspection of the visual summary or essence images, more detailed information can be requested for further investigation at 120, e.g. retrieving larger selections of source video from the data archive manager 112. Visual summary essence images may also be streamed ahead of time.

Visual essences are generally compact and/or condensed so that they require less bandwidth than video data for visualization in an auditing system; only frames or limited video selections need be transmitted to the auditor for review, not a much larger or entire video feed as is typically required in the prior art. Smaller visual essences (for example, discrete data files) may also be more readily downloaded to, and stored in local machines for faster system responses compared to larger video feeds. Further, as analysts need only watch summaries about an event, pruning operations are faster and their throughput rate may be higher. Human auditors generally make fewer mistakes than results obtained by auditing through filtering by machine intelligence, and thus human auditors may provide better efficiencies in applications where true events may occur infrequently, such as in retail fraud detection or abandoned baggage alerts, and still other examples will be apparent to one skilled in the art.

Embodiments of the present invention may be utilized in a variety of applications wherein visual events may be associated with discrete, time-ordered transactions. For example, visual events may be created with respect to human movements in certain areas and matched to turnstile admissions, vehicles detected in relation to a transit point, badge or card swipes from an automated door lock, ticket kiosk, etc., which indicate trespassing, theft, unauthorized access to restricted areas, etc. Approaches may focus on a variety of data outputs associated with human activities, for example business transaction logs, retail receipts, injury reports, etc., and the present invention is not limited to only those examples provided herein.

Figure 3:
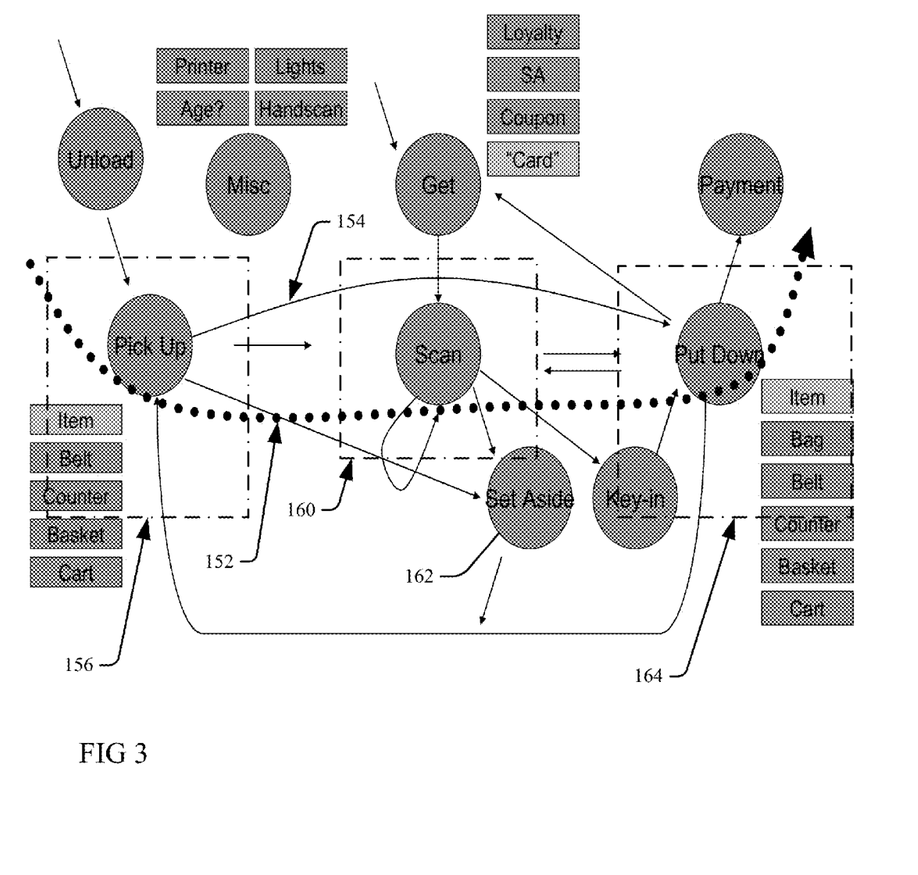
FIG. 3 is an overhead perspective state diagram of a physical location appropriate for analysis through visual essences according to the present invention.

Examples of the present invention may be implemented to quickly distinguish fraudulent retail "sweet-hearting" events from "long-scanning" and other non-fraudulent events associated with alerts triggered through review of a retail or other scanning area. For example, FIG. 3 is an overhead perspective state diagram of a plurality of possible movements and actions 162 of a cashier in a retail context (for example, of a scanning lane) with respect to possible movement vectors 152, 154. (It will be understood that as used herein "cashier" is a generic term to denote a person scanning an item, and that embodiments contemplate that the scanning person may be a clerk or cashier as well as a customer, bagger, manager or other person.) In a simple scanning motion path vector 152 an item is picked-up from a pick-up area 156, scanned by passing the item within scanning range of a scanner in a scanning area 160 and then put down in a bagging or drop area 164. Examples of the pick-up areas 156 include an intake belt, a counter, a shopping basket and a cart, and the put-down area 164 may be one or more of a distribution belt, counter, shopping basket or shopping cart, each of which may entail different motions. The vectors 154 each represent an observed motion relative to other actions 162 of a cashier and observable in a video feed, illustratively including unloading items, and getting and scanning loyalty cards, supervisor/assistant override cards (SA), coupons or other bar-code cards.

A significant portion of retail shrink may be attributed to employees and occurs around cashiers at the point of sale (POS). Sweet-hearting or "fake scanning" describes the action of a cashier in intentionally failing to scan or otherwise enter an item into a retail transaction in order to provide the merchandise free of charge for a customer presenting the items for purchase, usually by moving the item from an input (pick-up) location through the processing (scan) area and into the output (drop or bagging) area by covering up the item bar code, stacking an item on top of another to occlude the scanner from reading the code or passing the item around the scan area during a scan motion to intentionally avoid a bar code reader in the scan area with respect to a bar code of the free item.

Although video analytics, bar code transaction review and other techniques may detect possible sweat-hearting activities and generate alerts for further analysis and review of video feeds of a retail scanning area, such alerts usually fail to distinguish long-scanning events. Long-scanning events exhibit a long time gap between pick-up, scan and/or drop events in a given retail transaction of an object, and wherein an otherwise legitimate scanning event may result in an erroneous report of a missing or fake scan or other system failure to capture the scanned information, through no malicious intent by the scanning cashier. For example, the motion vectors 152, 154 may entail different motions relative to others of the vectors 152, 154, and they may also have different time signatures (for example, it may take longer to reach into a cart for a pick-up or a drop relative to a belt pick-up or drop). Movement of items from the pick-up area 156 may bypass the scanning area 160 before entering the put-down area 164 for legitimate purposes, for example, to set aside in combination with directly keying-in of an item code with a missing or damaged bar code, or in weighing an item sold by weight.

Video feeds for individual scans may also differ as a result of different cashier or environmental characteristics, for example, lighting may change due to time of day (daylight versus artificial lighting at night), and the age or physical size or ability of the individual cashiers may impact the range of arm motion, motion paths selected or the times to complete similar paths relative to other cashiers, and any of these attributes may result in a long-scan falsely reportable as a sweet-hearting. For example, in some prior art systems, if a time gap is longer than an expected or predefined time interval (for example two seconds, five seconds, one minute, or another value from a range encompassing said values, etc.), the scanning system may incorrectly log an item scan, or even fail to log the transaction or item scanned, and thus a fake scan/sweet-hearting alert may be issued under an assumption that the cashier has intentionally avoided scanning an item, where in fact the cashier may be performing appropriately and no fake scan has occurred.

Accordingly, in one example of a method or system according to the present invention for implementation in the retail context of FIG. 3, transaction bar code events reported in log data from the scanner area 160 are utilized to generate visual essence data comprising discrete images from an original video stream or larger collection of still images and as a function of a temporal alignment with the bar code events for analysis through video analytics for alert generation (e.g. at 202 of FIG. 2). In one embodiment, the visual essence comprises a set of three still images subset frames of video: (1) a pick-up frame {P} showing the pick-up area 156 at a predetermined amount of time prior to a logged bar code event {b} (for example, one second prior), which is expected to show a retail clerk picking up an item from the pick-up area 156; (2) a scanning action frame {S} showing the scanning area 160 at the time of the logged bar code event {b}, which is expected to show the clerk moving the picked-up item over a scanner in the scanning area 160; and (3) a deposit or drop frame {D} acquired from the check-out or customer delivery area 164 at a predetermined amount of time after the logged bar code event {b} (for example, one second later), which is expected to show the clerk depositing the item in the customer delivery area 164. The bar code transaction should be generated or otherwise associated with each of the three basic visual events that occur in this temporally sequential order: first picking up an item, then scanning the picked-up item in, and lastly depositing the picked-up and scanned item. Thus, each barcode scan {b} should correspond to a set of one each of these three different image primitives types {PSD}.

The visual essence may also be presented with a text identifier of the item registered in the logged bar code event by the scanner, for example "1 Lb bag of Carrots, Bar Code #xyz." Thus, a human auditor may compare the three visual essence images to the text identifier and quickly determine whether an alert of fraudulent action is false (for example, each of the images show a one pound bag of carrots as expected), or if instead the event may be true (for example, one or more of the images shows a wine bottle instead), without having to review a much larger original video selection as would be required in the prior art. If needed, the auditor may optionally request more data from the data repository 112 (for example, a stored vide stream with more images of the same event, or historic video or data relative to the clerk or the item, etc.) for an additional true/false determination.

Embodiments of the present invention may also provide improved efficiencies in public transportation security applications. Thus, a data stream from data sensors may be video streams from one or more cameras wherein video analytics report alerts for possible abandoned bags, for example, generating a list of suspected abandoned bags through application of an abandoned baggage detection algorithm to the video streams. Exemplary algorithms are taught by "Location Based Baggage Detection for Transit Vehicles" by Guillaume Milcent and Yang Cai, CMU-CyLab-05-008 Dec. 9, 2005, Carnegie Mellon University, Pittsburgh, Pa., USA, and still other examples appropriate for use with the present invention will be known to one skilled in the art. The visual essence data 116 may comprise a single image of a suspected abandoned bag; if instead of an abandoned bag, the alert is generated by a stationary person (for example, someone sleeping in a passenger terminal seat and thereby remaining stationary for a longer-than-expected timeframe, causing an automated system to mistake the person for a large luggage item), then a human auditor reviewing the single image visual essence will quickly determine that this is not a bag and that the alert is false, wherein an automated system may have to expend significant computational resources to distinguish the person from an object, or a prior art auditor would have to review a much larger video feed selection, to make the same false-alert determination. In another example, a quick comparison of a single image of a suspected bag and another image taken before and after a suspected abandonment recognition that has triggered an alert, along with text information (indicating time frames as to how long the bag has been left outside of the apparent control of any nearby person) may enable a quick determination that the alert is false as the image reveals a person associated with the bag still proximate to the bag though not immediately adjacent to the bag. Lighting changes may also cause mistakes as to object presence. For example, a shadow may result in object detection, but a quick review of a visual essence can determine that the shadow is not an object, a determination that may be very difficult for a computer.

In another aspect, a good event detection or recall rate (for example, 90% of events noted and recalled by alerts) may require a lot of false positives to generate a meaningful Receiver Operating Characteristic (ROC) curve through plotting sensitivity versus specificity of results. Lowering false positives returned may provide efficiencies in the prior art, but it will also harm the recall, for example, catching only 50% of true events. To catch a relatively small amount of true events within a large stream of events, a significant amount of alerts must be generated from false events. The present invention enables processing of a high level of false events by enabling the rapid culling of the false events through quick human review of the visual essence data, and thereby enables high recall rates where true event frequencies may be low.

Automated video analytics systems and methods performed by computers and other programmable devices may perform analysis on original video and other data feeds to generate alerts for use in visual essence creation and association, and some may also use such processes to identify and select or generate images used in the visual essences primitives and/or to formulate the essence groupings. For example, alerts may be generated by applying computer vision and pattern recognition (CVPR) algorithms to a video feed input, such as by algorithms taught by "Recognition of Repetitive Sequential Human Activity" by Quanfu Fan et al., IBM T. J. Watson Research Center, Hawthorne, N.Y., USA, presented at CVPR 2009; or also by "GRAPH BASED EVENT DETECTION FROM REALISTIC VIDEOS USING WEAK FEATURE CORRESPONDENCE", by Lei Ding et al., IBM T. J. Watson Research Center, Hawthorne, N.Y., USA, presented at ICASSP 2010; and still other appropriate examples for use with the present invention will be apparent to one skilled in the art.

Visual essence images may be generated through analysis of activity detected within images from given areas, in some embodiments independent of any temporally relationship to a logged event or other data stream. For example, distinct Region of Interests (ROI) may be defined within physical spaces within images for the creation of and analysis of the video images, and motion pixels obtained by frame differencing (or differentiating) a video stream may be counted in each ROI for each frame and normalized by the area of the ROI. For example, referring again to FIG. 3, the pick-up area 156, scan area 160 and drop-off area 164 may be defined for creating respective pick-up {P}, scan {S} and drop-off {D} visual essence image primitives as a function of patterns observed in motion sequences within said areas, generally in response to motion pixels associated with the movement of an item and/or a hand (or both hands) of a cashier within each region. Each area 156/160/164 may itself define an ROI, with motion pixels obtained by frame differencing a video stream counted in each ROI for each frame and normalized by the area of the respective ROI 156/160/164. Alternatively, any region 156/160/164 may encompass multiple distinct (and sometimes overlapping) ROI's to provide additional granularity or primitive creation capabilities. One example for distinguishing motion patterns observed in resulting motion sequences within ROI's appropriate for practice with the present invention is taught by "Detecting Sweethearting in Retail Surveillance Videos" by Quanfu Fan et al., ICCASSP, 2009.

Figure 4:
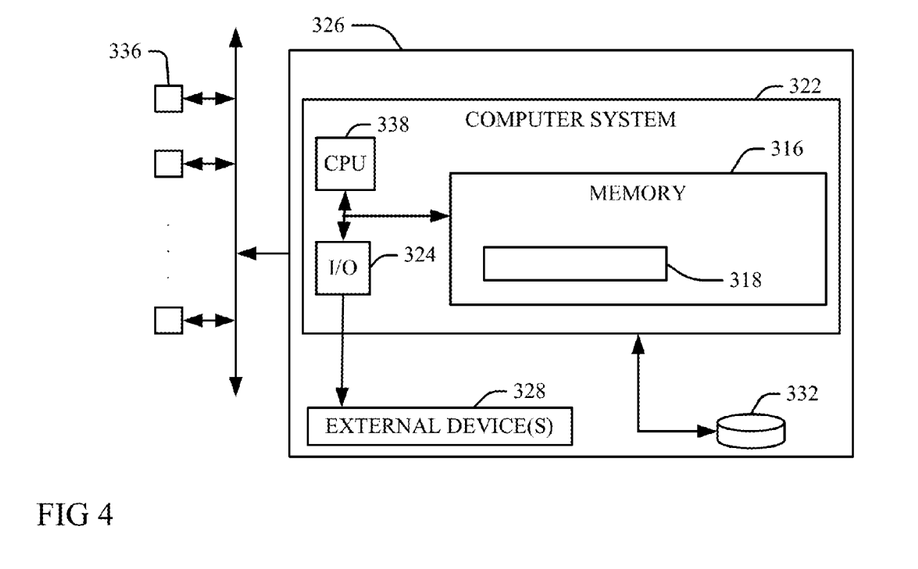
FIG. 4 is a diagrammatic illustration of a computerized implementation of an embodiment of the present invention.

Referring now to FIG. 4, an exemplary computerized implementation of an embodiment of the present invention includes computer or other programmable device 322 in communication with video or still image devices 336 (for example, a video camera or video server) that generates visual essence data for determination of human behavior according to the present invention, for example, in response to computer readable code 318 in a file residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication throughout the network 326 can occur via any combination of various types of communication links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external I/O devices/resources 328 and storage systems 332. In general, the processing unit 338 may execute computer program code, such as the code to implement one or more of the process steps illustrated in the Figures, which may be stored in the memory 316 and/or external storage system 332 or device 328.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 324 can comprise any system for exchanging information with one or more of the external device 328. Still further, it is understood that one or more additional components (e.g., system software, math co-processing unit, etc.), not shown, can be included in the computer 322.

One embodiment performs process steps of the invention on a subscription, advertising, and/or fee basis. That is, a service provider could offer to provide automated analysis of video data for determination of human behavior. In this case, the service provider can create, maintain, and support, etc., a computer infrastructure, such as the network computer infrastructure 326 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles for automated analysis of video data for determination of human behavior described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for auditing video analytics data through review of selective subsets of video frame images, the method comprising:
   in response to a triggering alert event, a processing unit generating a subset of frame images from a video stream of a plurality of frame images of a scanning station as a function of a temporal relationship of each of the subset frame images to a scan of a bar code that is associated with the triggering alert event and reported in log data from a scanner area of the scanning station, the subset of images consisting of:
   a pick-up frame image showing a pick-up area of the scanning station at a predetermined amount of time prior to a time of the reported scan of the bar code that is selected so that the pick-up frame image is expected to show a person picking up an item associated with the bar code from the pick-up area, wherein the pick-up area is different from the scanner area;
   a scanning action frame image showing the scanner area at a time of the reported scan of the bar code that is contemporaneous with the triggering alert event and that is expected to show the person moving the item over the scanner in the scanning area; and
   a deposit frame image showing a delivery area of the scanning station at a predetermined time after the time of the reported scan of the bar code that is selected so that the deposit frame image is expected to show the person depositing the item in the deliver area, wherein the delivery area is different from the scanner area and the pick-up area;
   the processing unit presenting the generated subset of frame images to a human auditor for review in a temporally sequential order in association with a text identifier of the item that is registered with the reported scan of the bar code and without any other of the video stream frame images to enable the human auditor to determine whether the triggering alert event is a true or false alert, or whether additional image frames from the video stream are required to determine whether the alert event is true or false; and
   in response to the human auditor determining from the subset of frame images presented in the temporally sequential order in association with the text identifier without any other of the video stream frame images that the additional video frames are required to determine whether the alert event is true or false, the processing unit presenting the additional image frames from the video stream to the human auditor for review.

2. The method of claim 1, further comprising:
   archiving the video stream frame images in a repository; and
   the processing unit retrieving from the repository the additional video frames presented for review in response to the human auditor determining that the additional video frames are required to determine whether the alert event is false.

3. The method of claim 2, further comprising the processing unit:
   defining distinct regions of interest within physical spaces within the frame images of the video stream of each of the pick-up, scanner and delivery areas;
   obtaining motion pixels from differences in the video stream frame images within respective ones of each of the distinct pick-up, scanner and delivery area regions;
   determining patterns of motion sequences of the obtained motion pixels within each of the distinct pick-up, scanner and delivery area regions in association with the movement of a hand of the person within each of the regions; and
   determining an occurrence of the triggering alert event if a time gap between the determined pattern of motion sequence associated with the movement of the hand within the scanner region and at least one of the determined patterns of motion sequence associated with the movement of the hand within the pick-up and delivery area regions is longer than an expected time interval.

4. The method of claim 3, wherein:
   the selected predetermined amount of time prior to the time of the reported scan of the bar code is one second prior to the time of the reported scan;
   the selected predetermined amount of time after the time of the reported scan of the bar code is one second after the time of the reported scan, and
   the expected time interval is two seconds, five seconds or one minute.

5. A computer system for auditing video analytics data through review of selective subsets of video frame images, the computer system comprising:
   a processing unit, computer readable memory and a computer readable storage medium;
   first program instructions to, in response to a triggering alert event, generate a subset of frame images from a video stream of a plurality of frame images of a scanning station as a function of a temporal relationship of each of the subset images to a scan of a bar code that is associated with the triggering alert event and reported in log data from a scanner area of the scanning station, the subset of images consisting of:

a pick-up frame image showing a pick-up area of the scanning station at a predetermined amount of time prior to a time of the reported scan of the bar code that is selected so that the pick-up frame image is expected to show a person picking up an item associated with the bar code from the pick-up area, wherein the pick-up area is different from the scanner area;

a scanning action frame image showing the scanner area at a time of the reported scan of the bar code that is contemporaneous with the triggering alert event and that is expected to show the person moving the item over the scanner in the scanning area; and a deposit frame image showing a delivery area of the scanning station at a predetermined time after the time of the reported scan of the bar code that is selected so that the deposit frame image is expected to show the person depositing the item in the deliver area, wherein the delivery area is different from the scanner area and the pick-up area;

second program instructions to present the generated subset of frame images to a human auditor for review in a temporally sequential order in association with a text identifier of the item that is registered with the reported scan of the bar code and without any other of the video stream frame images to enable the human auditor to determine whether the triggering alert event is a true or false alert, or whether additional frames from the video stream are required to determine whether the alert event is true or false; and third program instructions to, in response to the human auditor determining from the subset of frame images presented in the temporally sequential order in association with the text identifier and without any other of the video stream frame images that the additional frames are required to determine whether the alert event is true or false, present the additional frames to the human auditor for review; and wherein the first, second and third program instructions are stored on the computer readable storage medium for execution by the processing unit via the computer readable memory.

6. The computer system of claim 5, further comprising:

fourth program instructions to archive the video stream images in a repository;

wherein the third program instructions are further to retrieve from the repository the additional video frames presented for review in response to the human auditor determining that the additional video frames are required to determine whether the alert event is false; and wherein the fourth program instructions are stored on the computer readable storage medium for execution by the processing unit via the computer readable memory.

7. The computer system of claim 6, further comprising:

fifth program instructions to:

define distinct regions of interest within physical spaces within the frame images of the video stream of each of the pick-up, scanner and delivery areas;

obtain motion pixels from differences in the video stream frame images within respective ones of each of the distinct pick-up, scanner and delivery area regions;

determine patterns of motion sequences of the obtained motion pixels within each of the distinct pick-up, scanner and delivery area regions in association with the movement of a hand of the person within each of the regions; and determine an occurrence of the triggering alert event if a time gap between the determined pattern of motion sequence associated with the movement of the hand within the scanner region and at least one of the determined patterns of motion sequence associated with the movement of the hand within the pick-up and delivery area regions is longer than an expected time interval; and wherein the fifth program instructions are stored on the computer readable storage medium for execution by the processing unit via the computer readable memory.

8. The computer system of claim 7, wherein:

the selected predetermined amount of time prior to the time of the reported scan of the bar code is one second prior to the time of the reported scan;

the selected predetermined amount of time after the time of the reported scan of the bar code is one second after the time of the reported scan; and the expected time interval is two seconds, five seconds or one minute.

9. A computer program product for auditing video analytics data through review of selective subsets of video frame images, the computer program product comprising:

a computer readable storage medium;

first program instructions to, in response to a triggering alert event, generate a subset of frame images from a video stream of a plurality of frame images of a scanning station as a function of a temporal relationship of each of the subset images to a scan of a bar code that is associated with the triggering alert event and reported in log data front a scanner area of the scanning station, the subset of images consisting of:

a pick-up frame image showing a pick-up area of the scanning station at a predetermined amount of time prior to a time of the reported scan of the bar code that is selected so that the pick-up frame image is expected to show a person picking up an item associated with the bar code from the pick-up area, wherein the pick-up area is different from the scanner area;

a scanning action frame image showing the scanner area at a time of the reported scan of the bar code that is contemporaneous with the triggering alert event and that is expected to show the person moving the item over the scanner in the scanning area; and a deposit frame image showing a delivery area of the scanning station at a predetermined time after the time of the reported scan of the bar code that is selected so that the deposit frame image is expected to show the person depositing the item in the delivery area, wherein the delivery area is different from the scanner area and the pick-up area;

second program instructions to present the generated subset of frame images to a human auditor for review in a temporally sequential order in association with a text identifier of the item that is registered with the reported scan of the bar code and without any other of the video stream frame images to enable the human auditor to determine whether the triggering alert event is a true or false alert, or whether additional frames from the video stream are required to determine whether the alert event is true or false; and third program instructions to, in response to the human auditor determining from the subset of frame images presented in the temporally sequential order in association with the text identifier and without any other of the video stream frame images that the additional frames are required to determine whether the alert event is true or false, present the additional frames to the human auditor for review; and wherein the first, second and third program instructions are stored on the computer readable storage medium.

10. The computer program product of claim 9, further comprising:

fourth program instructions to archive the video stream images in a repository;

wherein the third program instructions are further to retrieve from the repository the additional video frames presented for review in response to the human auditor determining that the additional video frames are required to determine whether the alert event is false; and wherein the fourth program instructions are stored on the computer readable storage medium.

11. The computer program product of claim 10, further comprising:

fifth program instructions to:

define distinct regions of interest within physical spaces within the frame images of the video stream of each of the pick-up, scanner and delivery areas;

obtain motion pixels from differences in the video stream frame images within respective ones of each of the distinct pick-up, scanner and delivery area regions;

determine patterns of motion sequences of the obtained motion pixels within each of the distinct pick-up, scanner and delivery area regions in association with the movement of a hand of the person within each of the regions; and determine an occurrence of the triggering alert event if a time gap between the determined pattern of motion sequence associated with the movement of the hand within the scanner region and at least one of the determined patterns of motion sequence associated with the movement of the hand within the pick-up and delivery area regions is longer than an expected time interval; and wherein the fifth program instructions are stored on the computer readable storage system medium.

12. The computer program product of claim 11, wherein:

the selected predetermined amount of time prior to the time of the reported scan of the bar code is one second prior to the time of the reported scan;

the selected predetermined amount of time after the time of the reported scan of the bar code is one second after the time of the reported scan; and the expected time interval is two seconds, five seconds or one minute.

13. A method for providing a service for auditing video analytics data through review of selective subsets of video frame images, the method comprising:

providing a computer infrastructure that:

in response to a triggering alert event, generates a subset of frame images from a video stream of a plurality of frame images of a scanning station as a function of a temporal relationship of each of the subset images to a scan of a bar code that is associated with the triggering alert event and reported in log data from a scanner area of the scanning station, the subset of images consisting of:

a pick-up frame image showing a pick-up area of the scanning station at a predetermined amount of time prior to a time of the reported scan of the bar code that is selected so that the pick-up frame image is expected to show a person picking up an item associated with the bar code from the pick-up area, wherein the pick-up area is different from the scanner area;

a scanning action frame image showing the scanner area at a time of the reported scan of the bar code that is contemporaneous with the triggering alert event and that is expected to show the person moving the item over the scanner in the scanning area; and a deposit frame image showing a delivery area of the scanning station at a predetermined time after the time of the reported scan of the bar code that is selected so that the deposit frame image is expected to show the person depositing the item in the delivery area, wherein the delivery area is different from the scanner area and the pick-up area;

presents the generated subset of frame images to a human auditor for review in a temporally sequential order in association with a text identifier of the item that is registered with the reported scan of the bar code and without any other of the video stream frame images to enable the human auditor to determine whether the triggering alert event is a true or false alert, or whether additional frames from the video stream are required to determine whether the alert event is true or false; and in response to the human auditor determining from the subset of frame images presented in the temporally sequential order in association with the text identifier and without any other of the video stream frame images that the additional frames are required to determine whether the alert event is true or false, presents the additional frames to the human auditor for review.

14. The method of claim 13, wherein the computer infrastructure further:

archives the video stream images in a repository; and retrieves from the repository the additional video frames presented for review in response to the human auditor determining that the additional frames are required to determine whether the alert event is false.

15. The method of claim 14, wherein the computer infrastructure further:

defines distinct regions of interest within physical spaces within the frame images of the video stream of each of the pick-up, scanner and delivery areas;

obtains motion pixels from differences in the video stream frame images within respective ones of each of the distinct pick-up, scanner and delivery area regions;

determines patterns of motion sequences of the obtained motion pixels within each of the distinct pick-up, scanner and delivery area regions in association with the movement of a hand of the person within each of the regions; and determines an occurrence of the triggering alert event if a time gap between the determined pattern of motion sequence associated with the movement of the hand within the scanner region and at least one of the determined patterns of motion sequence associated with the movement of the hand within the pick-up and delivery area regions is longer than an expected time interval.

16. The method of claim 15, wherein:

the selected predetermined amount of time prior to the time of the reported scan of the bar code is one second prior to the time of the reported scan;

the selected predetermined amount of time after the time of the reported scan of the bar code is one second after the time of the reported scan; and the expected time interval is two seconds, five seconds or one minute.

\* \* \* \* \*